UNITED STATES PATENT OFFICE.

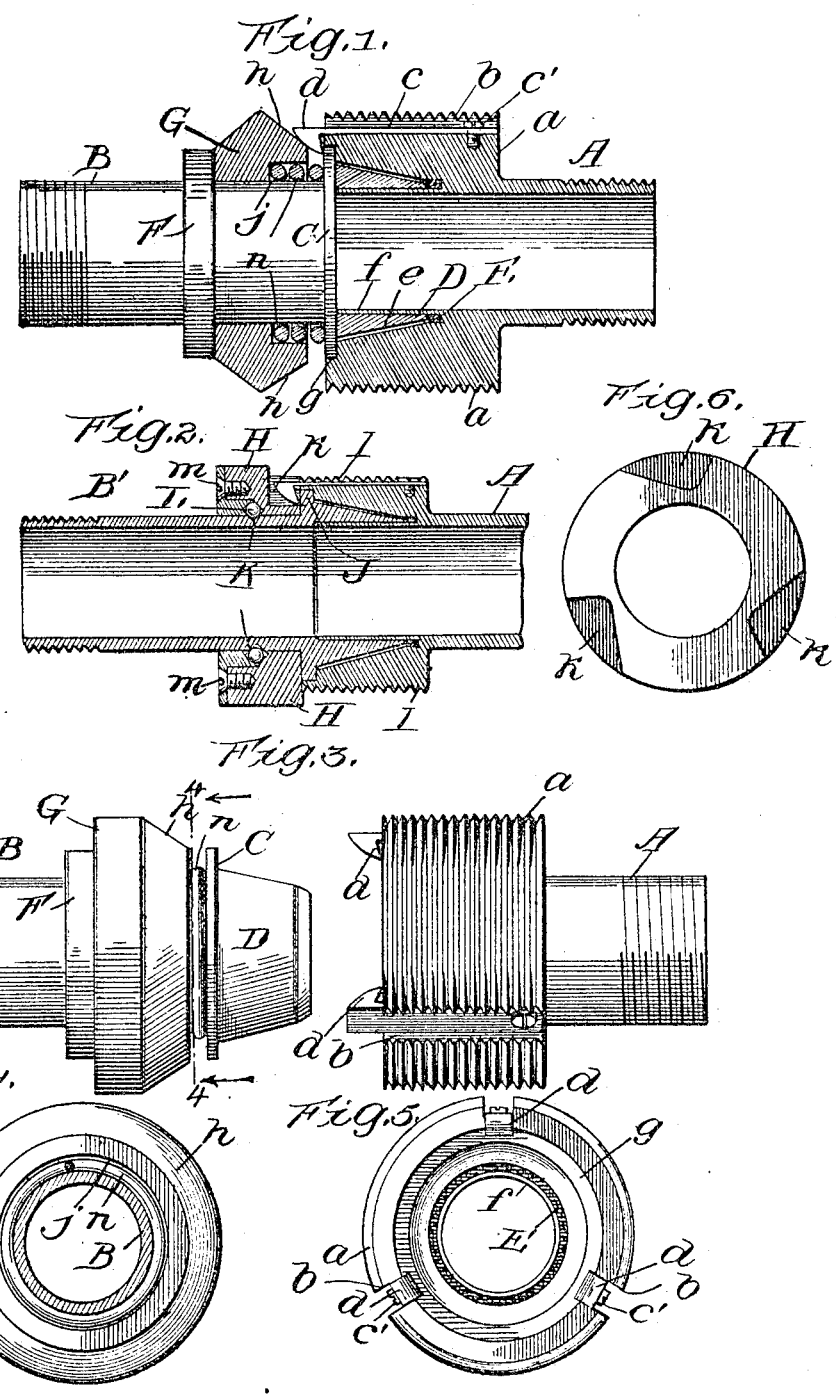

AUGUST J. ITRICH AND WILLIAM F. J. LUTZ, OF CHICAGO, ILLINOIS.

HOSE-COUPLING.

No. 798,795.          Specification of Letters Patent.          Patented Sept. 5, 1905.

Application filed March 13, 1905. Serial No. 249,862.

*To all whom it may concern:*

Be it known that we, AUGUST J. ITRICH and WILLIAM F. J. LUTZ, citizens of the United States, and residents of Chicago, in the county of Cook and State of Illinois, have invented certain new and useful Improvements in Hose-Couplings, of which the following is a full, clear, and exact description.

The object of our invention is to provide a simple and easily-manipulated coupling for hose, and particularly fire-hose, the coacting parts of which can be quickly united without the necessity of screwing them together, and when so connected are not liable to be accidentally separated by the twisting of the hose, which in case of fire is so likely to be done. This we accomplish by the means hereinafter fully described and as more particularly pointed out in the claims.

In the drawings, Figure 1 is a longitudinal central section of the coöperating parts of our improved coupling, showing them in locked relation. Fig. 2 is a similar section of a modified form of our invention. Fig. 3 is an end view of one of the parts of said modification. Fig. 4 is a side-elevation form of our invention shown in Fig. 1, showing the parts of the coupling in unlocked position. Fig. 5 is a transverse section of the left-hand part of the coupling as shown in Fig. 3, taken on dotted line 4 4 in said Fig. 3 looking in the direction indicated by the arrows. Fig. 6 is a view of the engaging end of the right-hand part of the coupling shown in Fig. 3.

Referring to the drawings, A represents one part of the coupling, and B the other part adapted to interlock therewith. The part A comprises a nipple of suitable length, one end portion of which is of the diameter of the bore of the hose, into which it is inserted and suitably secured in the usual manner. The other portion of this nipple is increased in diameter to a suitable extent to form a head $a$, which is preferably cylindrical and has its circumference screw-threaded, substantially as shown. The circumference of this head is provided with two or more longitudinal grooves $b$, located at suitable intervals apart, and seated in these grooves are flat springs $c$, whose ends farthest from the engaging end of the head are secured by means of screws $c'$. The opposite forward ends of these springs extend a suitable distance beyond the engaging face of the head and are provided with hooks $d$, which latter are preferably made of one piece therewith and project inward toward the axis of the coupling and have their backs or edges, which are engaged by the other part B of the coupling, as will hereinafter more fully appear, inclined from their engaging points to their extremities. The grooves $b$, in which these springs $c$ are seated, are of such depth as to permit of the operation of these hooks without interfering with a cap, which it might be considered desirable to screw over and upon the screw-threaded exterior of the head $a$. The springs $c$ are so positioned that the hooks $d$ have their extremities terminating in a plane corresponding to the transverse plane of the engaging face of the head $a$, which latter has at a point just outside of its bore an annular channel $e$ of considerable depth, the inner sides or circumference of which near the axis of the heads is substantially parallel with the bore of the part A, so as to leave a comparatively thin tubular shell $f$ between it and the adjacent end of the bore of the coupling. The outer side or circumference of the channel $e$ is beveled, and preferably has the outer edges $g$ thereof rabbeted, substantially as shown.

Part B of the hose-coupling comprises a nipple, which is preferably of a length slightly greater than that of the part A. The portion of the circumference thereof farthest from its engaging end is screw-threaded or otherwise constructed to permit of the adjacent end of the section of hose being fitted over and secured thereon, and the engaging end of this part B is provided with a circumferential flange C of the same diameter as the rabbeted edges of the channel $e$, into which it is adapted to be seated when the parts are locked together, as will hereinafter be more fully explained. Extending from this flange C is a tubular extension D, which corresponds in length to the depth of the channel $e$ of the head $a$ of the other part A of the coupling and is exteriorly tapered or beveled to enable it when the two parts of the hose are brought into interlocking relation to enter the channel $e$ and compress a suitable packing or gasket E, placed in the bottom of said channel to render the jointure of the two parts absolutely water-tight.

Between the flange C and a suitable collar F, secured on part B at a suitable point near its center of length, we surround the same with a loose ring G, which is of such length as to have a slight sliding or reciprocal movement between said flange and collar. The outer edge $h$ thereof nearest the head of part A is beveled, and the inner circumferential edge thereof is rabbeted to form a pocket $j$ for housing a small coil expansion-spring $n$, the action of which is to keep the ring G normally pressing against the collar F.

In operation when the two parts of the coupling are brought together the inclined backs of the hooks $d$ of the springs $c$ of one part come in contact with the flange C of the other part and are forced over the circumference of the same and then snap back to their normal position, so that their extremities snap back of flange C and securely retain the said flange in its rabbeted seat and the tapered extension D thereof in the channel $e$, and thus hold the two parts together. When it is desired to uncouple said parts A and B, the ring G is grasped and moved toward the flange C, so that its beveled edge $h$ will engage the inclined backs of the hooks $d$ and simultaneously force the same outward sufficient to enable the two parts to be separated.

In Fig. 2 we show a modified form of our invention. In this modification the part A' of the coupling is the same as part A of the preferred form of the invention shown in Figs. 1, 3, and 5. The other part B' of the coupling is the same as part B of the said preferred form except that the collar F is omitted. Instead of the ring G we employ a ring H, which latter has a series of recesses or notches $k$ in the outer edge of its engaging face that are located at suitable intervals apart with reference to the spring-hooks $c$ $d$ of the preferred form of the invention. One side of these recesses alines with the radii of the axis of the head, and the other side is beveled at an angle of about ninety degrees thereto, so that when the two parts A' and B' are brought together and interlocked by the spring-hooks I and the projecting hooked ends of said spring-hooks enter said recesses, rotating the head $h$ slightly and bringing the beveled sides of the recesses to bear outward upon the hooks, forces the latter outward sufficient to permit the flange J to be passed under their engaging points and the parts of the coupling separated. The ring H of this modified form of our invention is retained in position so that the engaging faces thereof will bear against the flange J and enable it to rotate freely by means of ball-bearings K. These bearings are made by increasing the diameter of the bore of the ring farthest from the flange J and providing the circumference of the body of the part B' with a suitably-located circumferential groove in which the bearing-balls are placed and operatively retained by a bushing L, whose outer end is provided with a circumferential flange, which is secured to the rear end of the ring by means of screws $m$.

What we claim as new is—

1. In a hose-coupling the combination with one part having a head of increased diameter having an annular channel in its engaging face provided with a packing in its innermost end, and a concentric shell forming the inside boundary of said channel, and having a series of longitudinal grooves in its circumference, longitudinal springs secured therein the ends of which extend beyond the engaging face of said head and are provided with inwardly-turned hooks, of the other part of the coupling having an end flange adapted to be engaged by said hooks and a tubular extension extending from the engaging face of said flange and adapted to enter the annular channel of the other part of the hose-coupling and contact with and compress the packing in the bottom thereof, and a head loose movable independently on said last-mentioned part of the coupling in juxtaposition to said flange and adapted to coact with said hooks and cause them to release said flange as set forth.

2. In a hose-coupling the combination with one part having a head of increased diameter having an annular channel in its engaging face provided with a packing in its innermost end, and a concentric shell forming the inside boundary of said channel, and having a series of longitudinal grooves in its circumference, longitudinal springs secured therein the ends of which extend beyond the engaging face of said head and are provided with inwardly-turned hooks, of the other part of the coupling having an end flange adapted to be engaged by said hooks and a tubular extension extending from the engaging face of said flange and adapted to enter the annular channel of the other part of the hose-coupling and contact with and compress the packing in the bottom thereof, and a head loose movable longitudinally independently on said last-mentioned part of the coupling in juxtaposition to said flange and adapted to coact with said hooks and cause them to release said flange as set forth.

3. In a hose-coupling the combination with one part having a head of increased diameter having an annular channel in its engaging face provided with a packing in its innermost end, and a concentric shell forming the inside boundary of said channel, and having a series of longitudinal grooves in its circumference, longitudinally-disposed springs secured therein the ends of which extend beyond the engaging face of said head and are provided with inturned hooks, of the other coöperating part of the coupling having an end flange adapted to be engaged by said hooks and having a tubular extension extending from the engaging face of said flange and adapted to enter the annular channel of the other part of the hose-coupling and contact with and compress the packing in the bottom thereof, and a longitudinally-movable automatically-returnable ring on said last-mentioned part of the coupling adapted to be moved toward and coact with said hooks to move them outwardly to release said flange.

4. In a hose-coupling the combination with one part having a head of increased diameter having an annular channel in its engaging face provided with a packing in its innermost end, and a concentric shell forming the inside boundary of said channel, and having a series of longitudinal grooves in its circumference, longitudinally-disposed springs secured therein the ends of which extend beyond the engaging face of said head and are provided with inturned hooks, of the other coöperating part of the coupling having an end flange adapted to be engaged by said hooks and having a tubular extension extending from the engaging face of said flange and adapted to enter the annular channel of the other part of the hose-coupling and contact with and compress the packing in the bottom thereof, and a longitudinally-movable ring on said last-mentioned part of the coupling the outer edge of the engaging face of which is beveled, which is adapted to be moved toward and coact with said hooks to move them outwardly to release said flange.

5. In a hose-coupling the combination with one part having a head of increased diameter having an annular channel in its engaging face provided with a packing in its innermost end, and a concentric shell forming the inside boundary of said channel, and having a series of longitudinal grooves in its circumference, longitudinally-disposed springs secured therein the ends of which extend beyond the engaging face of said head and are provided with inturned hooks, of the other coöperating part of the coupling having an end flange adapted to be engaged by said hooks and having a tubular extension extending from the engaging face of said flange and adapted to enter the annular channel of the other part of the hose-coupling and contact with and compress the packing in the bottom thereof, and a ring having a limited longitudinal movement on said last-mentioned part of the coupling the outer edge of the engaging face of which is beveled, which is adapted to be moved toward and coact with said hooks to move them outward to release said flange, and a coil-spring interposed between said flange and ring substantially as and for the purpose set forth.

In testimony whereof we have hereunto set our hands this 4th day of March, A. D. 1905.

AUGUST J. ITRICH.
WILLIAM F. J. LUTZ.

Witnesses:
FRANK D. THOMASON,
E. K. LUNDY.